US012581184B2

(12) United States Patent

Mori

(10) Patent No.: US 12,581,184 B2
(45) Date of Patent: Mar. 17, 2026

(54) ELECTRONIC APPARATUS CAPABLE OF DISPLAYING SETTING ITEM GROUP ON DISPLAY, CONTROL METHOD THEREFOR, AND STORAGE MEDIUM

(71) Applicant: CANON KABUSHIKI KAISHA, Tokyo (JP)

(72) Inventor: Naomi Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/584,826

(22) Filed: Feb. 22, 2024

(65) Prior Publication Data

US 2024/0292086 A1     Aug. 29, 2024

(30) Foreign Application Priority Data

Feb. 24, 2023     (JP) ................................. 2023-027220

(51) Int. Cl.
    *H04N 23/63*          (2023.01)
    *H04N 23/72*          (2023.01)
(52) U.S. Cl.
    CPC ......... *H04N 23/632* (2023.01); *H04N 23/633* (2023.01); *H04N 23/72* (2023.01)
(58) Field of Classification Search
    CPC .... H04N 23/72; H04N 23/632; H04N 23/631; H04N 23/633; H04N 23/65
    USPC ...................................................... 348/333.01
    See application file for complete search history.

(56) References Cited

U.S. PATENT DOCUMENTS

| | | | | |
|---|---|---|---|---|
| 8,843,853 | B1 * | 9/2014 | Smoak .................... | H04L 67/52 |
| | | | | 715/830 |
| 9,341,922 | B2 * | 5/2016 | Aoyama .............. | H04N 23/672 |
| 9,485,411 | B2 * | 11/2016 | Okada ................... | G06F 3/0487 |
| 10,254,922 | B2 * | 4/2019 | Watanabe ............ | H04N 1/0035 |
| 10,728,452 | B2 * | 7/2020 | Fukushima ............ | H04N 23/73 |
| 10,739,950 | B2 * | 8/2020 | Watanabe ........... | G06F 3/04847 |
| 2007/0216965 | A1 * | 9/2007 | Yoshihama ........ | H04N 1/00482 |
| | | | | 358/474 |
| 2011/0273606 | A1 * | 11/2011 | Hara ...................... | G03B 17/02 |
| | | | | 348/E5.022 |
| 2012/0288264 | A1 * | 11/2012 | Aoyama ................ | G03B 13/36 |
| | | | | 396/121 |
| 2013/0070275 | A1 * | 3/2013 | Kawashima ....... | H04N 1/00482 |
| | | | | 358/1.13 |

(Continued)

FOREIGN PATENT DOCUMENTS

JP            2016062115 A      4/2016

*Primary Examiner* — Pritham D Prabhakher
(74) *Attorney, Agent, or Firm* — Canon U.S.A., Inc. IP Division

(57)                    ABSTRACT

An electronic apparatus that is capable of causing a display to display a second display screen indicating registered items among a plurality of setting items, and allows users to reorder the items indicated on the second display screen with a simple operation. The display is caused to display a first display screen that indicates a first setting item group or the second display screen that indicates a second setting item group, which is a part of the first setting item group. An item is selected from the second setting item group on the second display screen. The order in which the item selected from the second setting item group is indicated on the second display screen is changed in response to a first operation that is performed while the second display screen is displayed by the display.

18 Claims, 12 Drawing Sheets

(56)                  References Cited

U.S. PATENT DOCUMENTS

| | | | |
|---|---|---|---|
| 2013/0111410 A1* | 5/2013 | Okada ................... | G06F 3/0489 |
| | | | 715/841 |
| 2015/0026632 A1* | 1/2015 | Wakabayashi ......... | H04N 23/69 |
| | | | 715/776 |
| 2016/0077687 A1* | 3/2016 | Watanabe ............. | G06F 3/0482 |
| | | | 715/763 |
| 2019/0179498 A1* | 6/2019 | Watanabe ............. | G06F 3/0482 |
| 2021/0200392 A1* | 7/2021 | Abe ................... | G06F 3/04817 |

* cited by examiner

ELECTRONIC APPARATUS CAPABLE OF DISPLAYING SETTING ITEM GROUP ON DISPLAY, CONTROL METHOD THEREFOR, AND STORAGE MEDIUM

BACKGROUND OF THE DISCLOSURE

Field of the Disclosure

The present disclosure relates to electronic apparatuses capable of displaying a setting item group on a display, control methods, and storage media.

Description of the Related Art

Electronic apparatuses such as cameras have a number of setting items to be set. Most of the electronic apparatuses are configured to display a menu screen allowing users to set the setting items on a display. The electronic apparatuses are also configured such that users can select a desired setting item to make its setting on the displayed menu screen.

In cases where the number of setting items on the menu screen is very large, it may be difficult for users to find and set a desired setting item among the setting items. In particular, as for a setting item that is frequently used, users need to find and set the setting item among a large number of setting items every time, which is troublesome for users, and hence there is room for improvement in operability of the electronic apparatuses.

One approach to the above circumstances, includes known electronic apparatuses equipped with a "My Menu function" allowing users to create their personalized menu items by registering only desired setting items selected from setting items indicated on the menu screen.

Japanese Patent Laid-Open Publication (Kokai) No. 2016-62115 proposes an electronic apparatus equipped with a function of, in order to improve operability for users, displaying a dedicated screen for reordering already registered menu items on a display, and prompting a user to reorder the menu items.

In such an electronic apparatus, however, in order to reorder registered menu items, users need to access the dedicated reordering screen and then perform operations on the dedicated reordering screen. For this reason, there is still room for improvement in terms of reducing troublesome operations for users and increasing operability of such an electronic apparatus.

SUMMARY OF THE DISCLOSURE

The present disclosure is directed to electronic apparatuses that are capable of causing a display to display a second display screen indicating registered items among a plurality of setting items, and allows users to reorder the items on the second display screen with a simple operation, control method for the electronic apparatuses, and storage media.

According to an aspect of the present disclosure, an electronic apparatus includes a display; a memory storing instructions; and at least one processor. The at least one processor executes the instructions to cause the display to display a first display screen that indicates a first setting item group or a second display screen that indicates a second setting item group that is a part of the first setting item group. The at least one processor executes the instructions to select an item from the second setting item group on the second display screen, and in response to a first operation performed while the second display screen is displayed by the display, change an order in which the item selected from the second setting item group is indicated on the second display screen.

According to the disclosed electronic apparatuses, and relevant control methods and storage media, the second display screen indicating registered items among a plurality of setting items is displayed by the display, and users are allowed to reorder the items on the second display screen with a simple operation.

Further features of the present disclosure will become apparent from the following description of exemplary embodiments with reference to the attached drawings.

DESCRIPTION OF THE EMBODIMENTS

The present disclosure will now be described in detail below with reference to the accompanying drawings showing embodiments thereof. Configurations in the embodiments described below, however, are examples for illustrative purposes only, and the scope of the present disclosure is not limited to the configurations in the embodiments described below. In the following description, an image pickup apparatus (camera 100) is taken as an example of electronic apparatuses.

Figure 1:
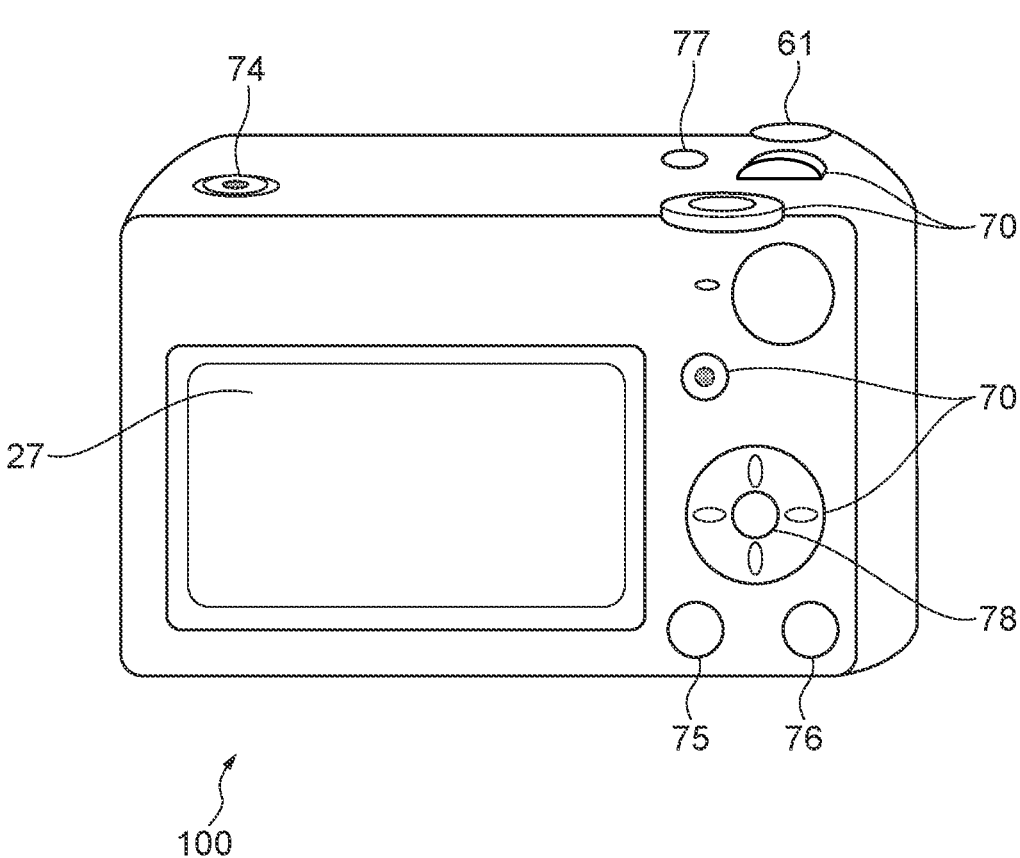
FIG. 1 is an external view of an image pickup apparatus (camera) that is one of electronic apparatuses according to embodiments of the present disclosure.

FIG. 1 is a view illustrating an appearance of a main body of the camera 100 as the image pickup apparatus, which is an example of electronic apparatuses according to the present embodiment. It should be noted that the near side of the drawing is the rear side of the camera 100, and the far side of the drawing is the front side of the camera 100.

A liquid crystal display 27 (display) is located in a central part of the rear face of the main body of the camera 100. The liquid crystal display 27 is a display device configured to display menu screens and various types of information, and so forth.

An operation unit 70 is located on the rear face and the top face of the main body of the camera 100. The operation unit 70 is a user interface (input device) for receiving operations performed by a user and inputting various operating instructions to the camera 100. The operation unit 70 according to the present embodiment includes a shutter button 61, a power switch 74, a menu button 75, a Q button 76, a My-Fn (My Function) button 77, and a set button 78.

The shutter button 61 is located on the front of the top face of the camera 100. The shutter button 61 is an operation unit for inputting an instruction to take a still image. The power switch 74 is a pushbutton for turning power on and off.

The menu button 75 located in a lower right portion of the rear face of the camera 100 is a pushbutton mainly for causing the liquid crystal display 27 to display a menu screen on when the pushbutton is pushed. In the present embodiment, by pressing and holding the menu button 75 with a menu screen being displayed by the liquid crystal display 27, a user is allowed to register on a My Menu tab a menu item which is in focus on the menu screen, or change the order in which a menu item, which is in focus on the menu screen, is indicated on the My Menu tab (a process of reordering or sorting the registered menu items). It should be noted that in this disclosure, the state in which a large tab, a small tab, or a setting item is "selected" is also described as "in focus".

The Q button 76 right next to the menu button 75 is used mainly to cause the liquid crystal display 27 to display a quick setting screen for a shooting screen or played back images. The My-Fn (My Function) button 77 located on the right side of the top face of the camera 100 is a button that can be personalized by a user assigning one or more of the functions (setting items) of the camera 100 to the button. When the My-Fn button 77 is pressed, the liquid crystal display 27 displays a setting screen corresponding to a function that is assigned to the My-Fn button 77, or the assigned function is executed. The set button 78 is a button that is used mainly to change and confirm setting values for the camera 100.

Figure 2:
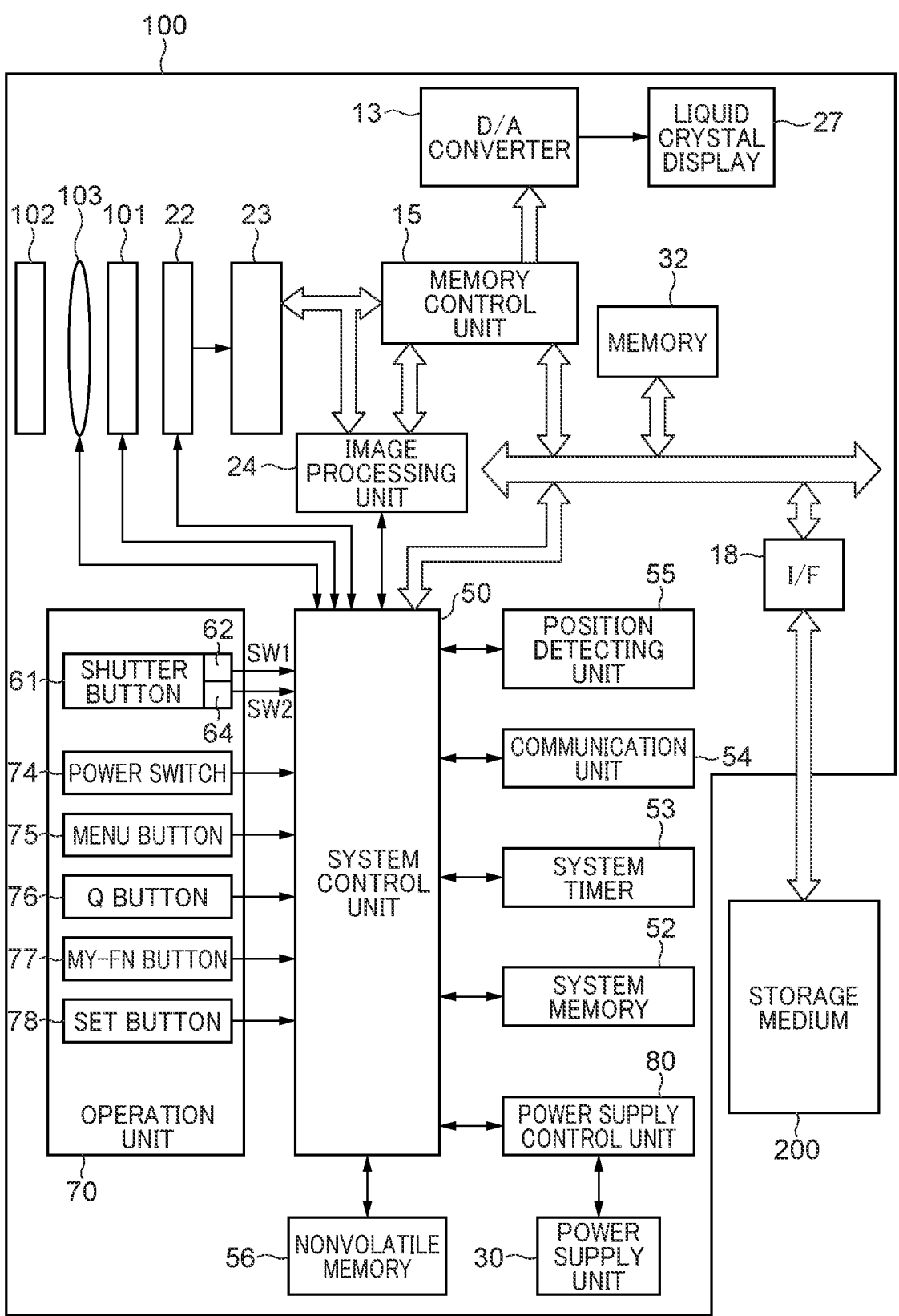
FIG. 2 is a diagram illustrating a configuration of a main body of the camera in FIG. 1.

FIG. 2 is a diagram illustrating a configuration of the camera 100. The camera 100 includes an image pickup system. The image pickup system includes a barrier 102, a taking lens 103, a shutter 101, an image pickup unit 22, and an A/D converter 23.

The barrier 102 covers the image pickup system including the taking lens 103 of the camera 100 to prevent the image pickup system including the taking lens 103, the shutter 101, and the image pickup unit 22 from getting dirty or damaged. The taking lens 103 is a lens group including a zoom lens and a focus lens. The shutter 101 is a device configured to control the length of time that the image pickup unit 22 is exposed to light and is equipped with an aperture function. The image pickup unit 22 is an image pickup device comprised of a CCD, a CMOS device, or the like. The A/D converter 23 configured to convert analog signals from the image pickup unit 22 to digital signals.

Digital signals output from the A/D converter 23 are supplied to an image processing unit 24, a memory control unit 15, and so forth. The image processing unit 24 is configured to perform predetermined image processing, such as resizing, e.g., pixel interpolation and reduction, and color conversion, on data from the A/D converter 23 or data from the memory control unit 15. The image processing unit 24 is further configured to perform predetermined arithmetic calculation using image data obtained from the image pickup unit 22, so that a system control unit 50 can perform exposure control and metering control based on obtained arithmetic calculation results. As a result, AF (auto focus) processing using the TTL (through the lens) method, AE (auto exposure), EF (flash pre-emission) processing, and so forth are performed in the camera 100. The image processing unit 24 is further configured to perform predetermined arithmetic calculation using image data obtained from the image pickup unit 22 and perform AWB (auto white balance) based on obtained arithmetic calculation results.

Digital signals output from the A/D converter 23 are written into the memory 32 via the image processing unit 24 and the memory control unit 15 or via the memory control unit 15. The memory 32 stores image data obtained by the image pickup unit 22 and subjected to digital conversion by the A/D converter 23 and image data to be displayed by the liquid crystal display 27. The memory 32 has a storage capacity large enough to store a predetermined number of still images and moving images and sound for a predetermined period of time.

The memory 32 also serves as a memory (video memory) for displaying images. A D/A converter 13 is located between the memory control unit 15 and the liquid crystal display 27. The D/A converter 13 is configured to convert data for image display stored in the memory 32 to analog signals and supplies them to the liquid crystal display 27 through the memory control unit 15. The image data to be displayed thus written into the memory 32 is supplied to the liquid crystal display 27 via the D/A converter 13 and is displayed by the liquid crystal display 27.

The liquid crystal display 27 is a display device, such as an LCD, and is configured to display images based on analog signals from the D/A converter 13. To display through-the-lens images (live view) by the liquid crystal display 27, analog signals from the image pickup unit 22 are converted to digital signals once by the A/D converter 23 and accumulated in the memory 32. The digital signals accumulated in the memory 32 are then converted to analog signals by the D/A converter 13 and successively transferred to the liquid crystal display 27. By displaying the successively-transferred analog signals, the liquid crystal display 27 is able to display through-the-lens images (live view).

A nonvolatile memory 56 is an electrically erasable programmable recording medium such as an EEPROM. The nonvolatile memory 56 is connected to the system control unit 50, and stores constants, programs, and so forth for operation of the system control unit 50. Here, the programs are computer programs for causing at least one processor to carrying out processes in various flowcharts, which will be described later, in the present embodiment.

The system control unit 50 is a controller for controlling the entire camera 100. The system control unit 50 is configured to execute programs stored in the nonvolatile memory 56 to realize processes according to the present embodiment, which will be described later. The processes of the flowcharts of FIG. 4 to FIG. 7, which will be described later, are implemented by the system control unit 50 reading out programs stored in the nonvolatile memory 56 and performing various arithmetic calculations and controlling various components based on the read-out programs.

A system memory 52, a system timer 53, a communication unit 54, and a position detecting unit 55 are connected to the system control unit 50. For example, RAM is used as the system memory 52. Constants, variables, programs read out from the nonvolatile memory 56 for operation of the system control unit 50 are loaded into the system memory 52. The system control unit 50 has a function of performing display control by controlling the memory 32 and the D/A converter 13. The system timer 53 is a clocking unit configured to measure time for use in a variety of control, time in a built-in clock, and so forth.

The communication unit 54 is configured to be communicably connected to an external device in wireless or wired manner, and send and receive video signals, audio signals, and so forth. The communication unit 54 is also configured to be connected to a wireless LANs (local-area networks) and/or the Internet. The communication unit 54 is capable of sending images (including through-the-lens images) taken by the image pickup unit 22 and sending images recorded in a storage medium 200 connected to the system control unit 50 via an interface (I/F) 18. The communication unit 54 is capable of receiving image data and various types of other information from the external device.

The I/F 18 is an interface configured to connect to the storage medium 200 such as a memory card for recording shot images and is comprised of, for example, a semiconductor memory, an optical disk, or a magnetic disk.

The position detecting unit 55 is configured to detect the position of the camera 100 relative to the direction of gravity. Based on the position detected by the position detecting unit 55, the position detecting unit 55 is capable of determining whether an image shot by the image pickup unit 22 is an image shot by holding the camera 100 horizontally or vertically. The system control unit 50 is capable of adding orientation information corresponding to the position detected by the position detecting unit 55 to an image file of the image shot by the image pickup unit 22 and rotating the image according to the orientation information and recording it in the storage medium 200 or the like. Examples of the position detecting unit 55 include an acceleration sensor and a gyro sensor.

The system control unit 50 is also connected to the operation unit 70. The operation unit 70 includes the shutter button 61, the power switch 74, the menu button 75, the Q button 76, the My-Fn button 77, the set button 78, and so forth. The operation unit 70 is a user interface (input device) for receiving operations performed by a user and inputting various operating instructions to the system control unit 50 and has various buttons (operators). The menu button 75, the Q button 76, the My-Fn button 77, and the set button 78 will be specifically described later.

The shutter button 61 includes a first shutter switch 62 and a second shutter switch 64. When the shutter button 61 provided in the camera 100 is pressed lightly, that is, pressed halfway down (a preparatory operation for shooting), the first shutter switch 62 is turned "ON" and generates a first shutter switch signal "SW1". In response to the first shutter switch signal "SW1", the system control unit 50 starts an operation such as AF (auto focus) processing, AE (auto exposure) processing, or EF (flash pre-emission) processing. On the other hand, when the shutter button 61 provided in the camera 100 is pressed fully, that is, pressed all the way down (a shooting instruction), the second shutter switch 64 is turned "ON" and generates a second shutter switch signal "SW2". In response to the second shutter switch signal "SW2", the system control unit 50 starts a series of operations for shooting, from reading of a signal from the image pickup unit 22 to writing of image data into the storage medium 200.

When any of various function icons indicated on the liquid crystal display 27 is selected, functions appropriate for the scene are assigned to the respective operators of the operation unit 70, so that the operators work as various function buttons. Examples of the function buttons include "End Button", "Back Button", "Next Image Button, "Jump Button", "Narrow down Button", and "Attribute Edit Button". For example, when the menu button 75 is pressed, a menu screen on which various settings can be configured is displayed by the liquid crystal display 27 or the like, and functions appropriate for the displayed menu screen are assigned to the operators of the operation unit 70 through the menu screen. It allows users to intuitively configure various settings using the menu screen displayed by the liquid crystal display 27, along with cross keys comprised of up, down, left, and right cross keys, and the set button 78.

A power supply control unit 80 connected to the system control unit 50 is comprised of a battery detecting circuit, a DC-DC converter, a switch circuit that switches blocks to be energized, and so forth, and is configured to detect the presence or absence of a battery installed onto the camera 100, the type of a battery, the residual amount of a battery, and so forth. Based on a result of the detection and an instruction from the system control unit 50, the power supply control unit 80 is configured to control the DC-DC converter to supply required voltage to desired components including the storage medium 200 for a required period of time. A power supply unit 30 is connected to and controlled by the power supply control unit 80. The power supply unit 30 is comprised of a primary battery such as an alkali battery or a lithium battery, a secondary battery such as a NiCd battery, a NiMH battery, or a Li battery, an AC adapter, and so forth.

Figure 3A:
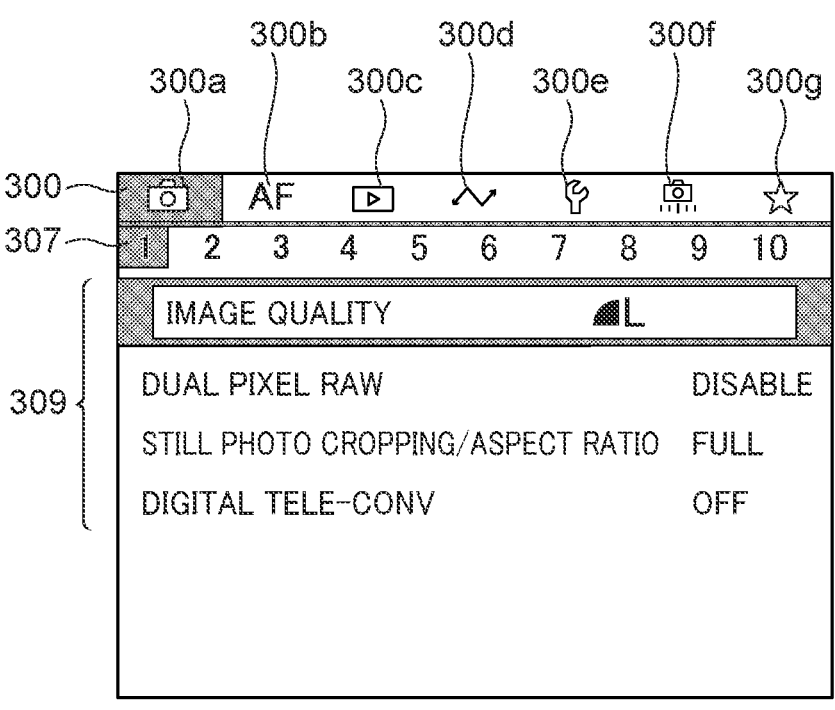
FIGS. 3A to 3F are views illustrating examples of screens that are displayed by a liquid crystal display on the main body of the camera in FIG. 1.
Figure 3B:
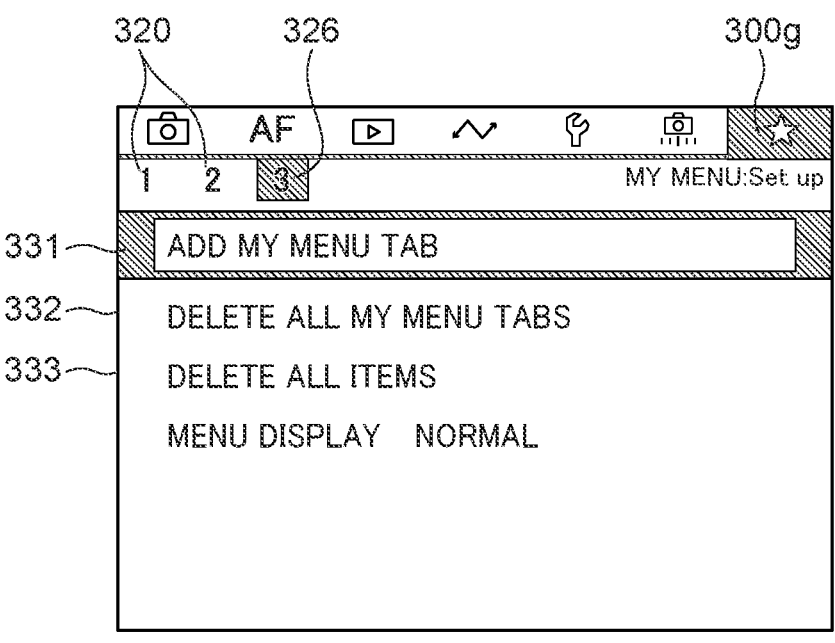
Figure 3C:
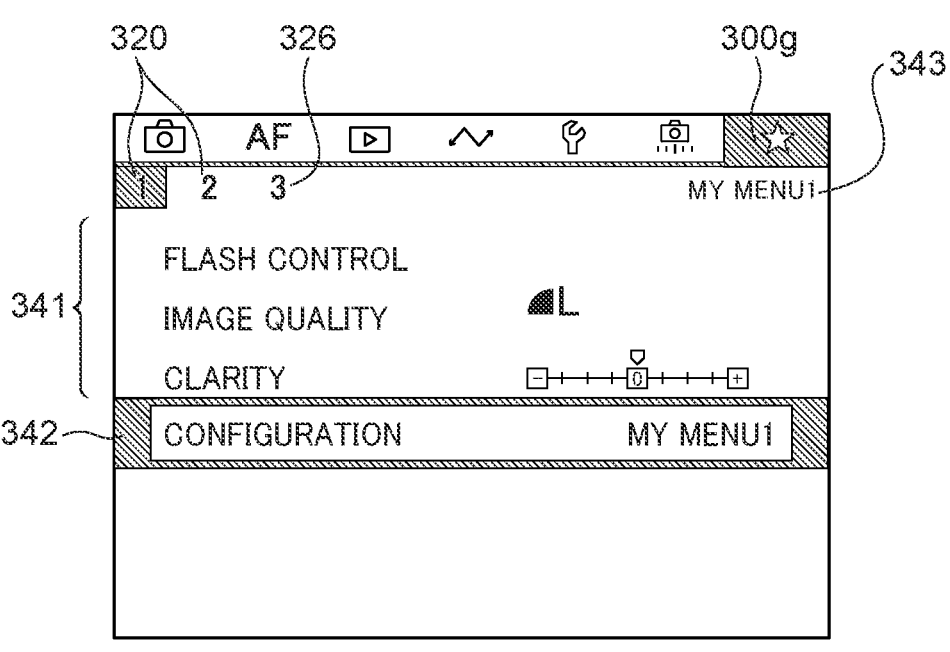
Figure 3D:
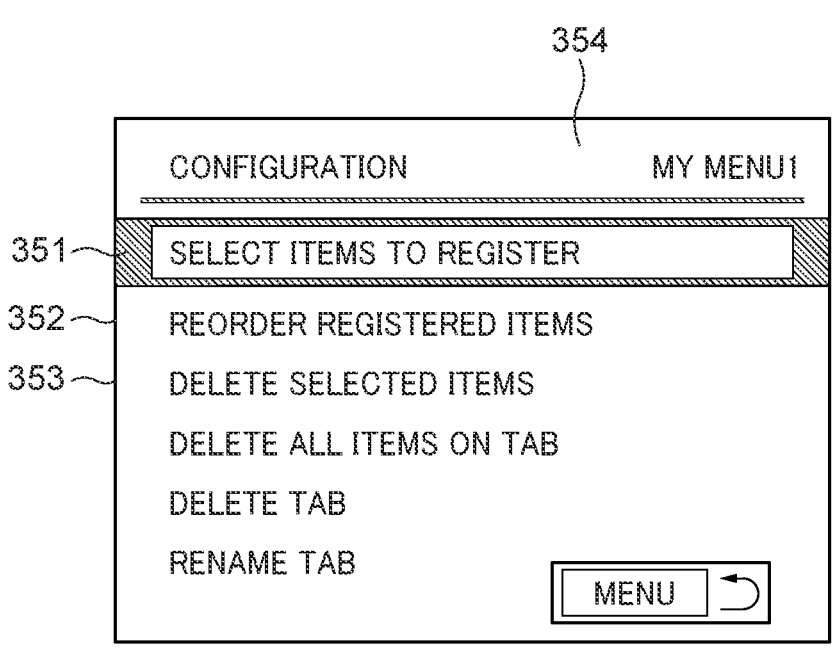
Figure 3E:
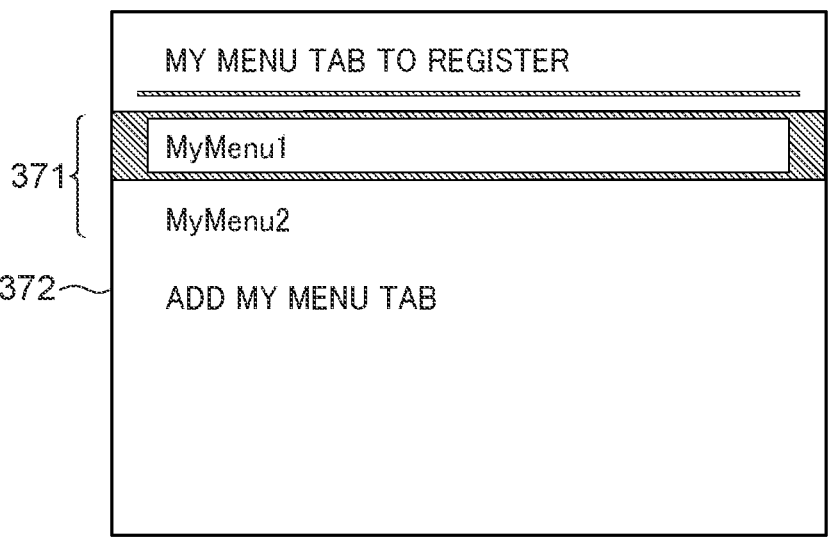
Figure 3F:
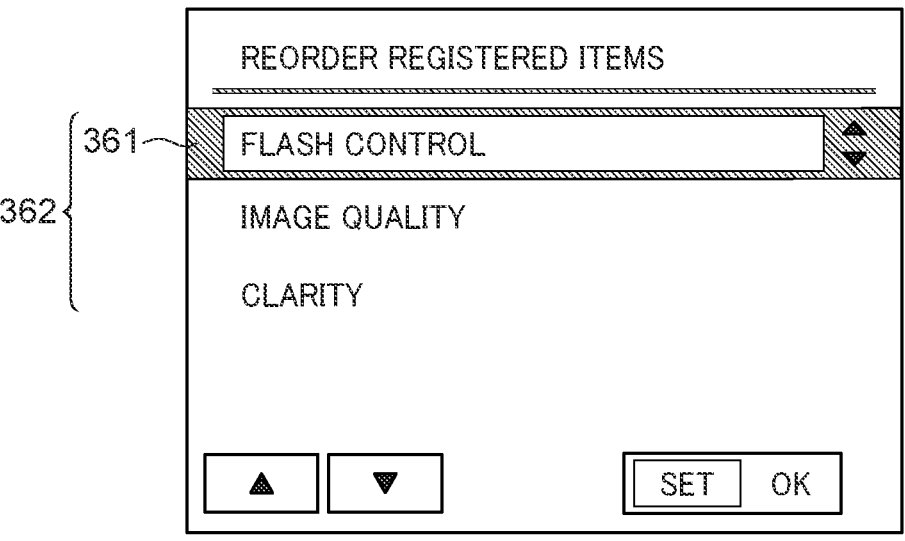

Referring to FIGS. 3A to 3F, a description will now be given of screens that are displayed by the liquid crystal display 27 of the camera 100 according to the present embodiment. FIG. 3A, FIG. 3B, and FIG. 3C are views illustrating examples of menu screens that are displayed by the liquid crystal display 27 when the menu button 75 (see FIG. 2) is pressed. FIG. 3D, FIG. 3E, and FIG. 3F are views illustrating examples of configuration screens that are displayed by the liquid crystal display 27.

FIG. 3A is a view illustrating an example of a menu screen that is displayed by the liquid crystal display 27 when the menu button 75 is pressed, i.e., an example of a setting menu screen that is displayed when one of large tabs 300 (tabs 300a to 300f) other than a My Menu large tab 300g is selected. FIG. 3A illustrates a state where a shooting tab 300a is selected.

As illustrated in FIG. 3A, the large tabs 300 are horizontally aligned in a row at the top of the menu screen, and among the large tabs 300, one which is highlighted in color or the like is a large tab in focus. In the present embodiment, the large tabs 300 include seven types of large tabs consisting of the shooting tab 300a, the AF tab 300b, the play back tab 300c, the communication function tab 300d, the function setting tab 300e, the custom function tab 300f, and the My Menu large tab 300g.

The shooting tab 300a, the AF tab 300b, the play back tab 300c, the communication function tab 300d, the function setting tab 300e, and the custom function tab 300f are large tabs for displaying setting menu screens on which menu items for making settings on the camera 100 are indicated. The large tabs are provided for the respective categories of menu items, so that users can easily reach a desired menu item for which they want to change settings.

The My Menu large tab 300g is a large tab for displaying a menu screen for a My Menu function, which is referred to as a My Menu screen and indicates only menu items registered by users among menu items included in the setting menu screens displayed in response to the selection of the large tabs 300a to 300f. The My Menu function allows a plurality of menu items in different categories (different large tabs), which are indicated on the respective setting menu screens, to be indicated on a single My Menu screen, and users are allowed to register frequently used menu items on the My Menu screen, so that the operability of the camera 100 is improved.

As illustrated in FIG. 3A, a list of small tabs 307 belonging to the selected large tab (the shooting tab 300a) among the large tabs 300 is indicated on the setting menu screen. Among the small tabs 307, a small tab highlighted in color or the like is a small tab in focus. The small tabs 307 are horizontally aligned in a row just below the large tabs 300. The number of small tabs 307 belonging to the large tabs 300 varies among the large tabs 300.

On the setting menu screen in FIG. 3A, a list of menu items belonging to the small tab 307 currently in focus is indicated as menu items 309. Among the menu items 309, one highlighted in color or the like is a menu item currently in focus.

In the present embodiment, since a number of menu items are included in each of the large tabs, small tabs are provided for each of the large tabs so that the menu items are indicated in a hierarchical manner. The menu items for configuring the camera 100 are categorized and indicated in a hierarchical manner using the large tabs and the small tabs, which reduces the number of user operations to be performed until users reach a desired menu item.

Users are allowed to move the focus on each of the large tabs 300, the small tabs 307, and the menu items 309 by operating the operation unit 70. In other words, selection on each of the large tabs 300, the small tabs 307, and the menu items 309 is made in response to user operations on the operation unit 70. The focus can be moved in the same manner while the menu screen for the My Menu function is displayed by the liquid crystal display 27 (FIG. 3B and FIG. 3C), as well as while the setting menu screen as illustrated in FIG. 3A is displayed by the liquid crystal display 27. The details of the large tabs 300, the small tabs 307, and the menu items 309 on the setting menu screen are determined based on settings such as shooting modes and on user operations.

FIG. 3B and FIG. 3C illustrates examples of menu screens for the My Menu Function, i.e., menu screens that are displayed by the liquid crystal display 27 when the My Menu large tab 300g is in focus. The My Menu large tab 300g has small tabs including a My Menu configuration tab 326 and My Menu tabs 320.

A My Menu configuration screen displayed by the liquid crystal display 27 in response to the selection of the My Menu configuration tab 326 includes menu items relating to configuration on the My Menu function (a menu item "ADD MY MENU TAB" 331, a menu item "DELETE ALL MY MENU TABS" 332, and a menu item "DELETE ALL ITEMS" 333). As distinct from the menu screen displayed in response to the selection of each of the My Menu tabs 320, the menu items relating to the configuration on the overall My Menu function are indicated on the My Menu configuration screen displayed by the liquid crystal display 27 in response to the selection of the My Menu configuration tab 326. In the examples illustrated in FIG. 3B and FIG. 3C, the two Menu tabs 320 are registered. The My Menu tabs 320 can be freely increased and reduced by a user operation, and the maximum number of My Menu tabs 320 that can be registered is specified in advance.

FIG. 3B illustrates the menu screen (My Menu configuration screen) that is displayed by the liquid crystal display 27 when the My Menu configuration tab 326 is in in focus. In a camera's initial state, no My Menu tab is registered, and hence there is no My Menu tab 320 in the menu screen for the My Menu function. To make a My Menu tab 320 appear on the menu screen, a user needs to select the menu item "ADD MY MENU TAB" 331 on the My Menu configuration screen, which is displayed by the liquid crystal display 27 in response to selection of the My Menu configuration tab 326, and then press the set button 78, so as to add the My Menu tab 320 on the menu screen.

The My Menu configuration screen that is displayed by the liquid crystal display 27 in response to selection of the My Menu configuration tab 326 is comprised of menu items such as the menu item "ADD MY MENU TAB" 331, the menu item "DELETE ALL MY MENU TABS" 332, and the menu item "DELETE ALL ITEMS" 333. The details of processes that are carried out by the system control unit 50 when one of those menu items is selected and then the set button 78 is pressed will be described later with reference to FIG. 5. In the present embodiment, the position at which the My Menu configuration tab 326 is indicated on the menu screen for the My Menu function is always the right end of My Menu tabs irrespective of the number of My Menu tabs. On the menu screen for the My Menu function, the My Menu tabs 320 are indicated from the left in the order in which they are added, and numbers in order from 1 are indicated on the small tabs (the My Menu configuration tab 326 and the My Menu tabs 320). In addition to the numbers indicated on the small tabs, tab names are set for the respective My Menu tabs 320.

FIG. 3C illustrates a menu screen (My Menu screen) that is displayed by the liquid crystal display 27 when the leftmost small tab on which "1" is indicated among the My Menu tabs 320 as the small tabs is in focus. While one of the My Menu tabs 320 is selected, a tab name 343 is indicated on the right-hand part of a small tab display field. In response to the selection of one of the My Menu tabs 320, menu items 341 registered on the selected My Menu tab 320 (My Menu screen) and an item "CONFIGURATION" 342 are indicated on the My Menu screen.

A My Menu tab name is also indicated together with the item "CONFIGURATION" 342 to make it clear that the item is for configuration on the selected My Menu tab. Referring to FIG. 3C, menu items "FLASH CONTROL", "IMAGE QUALITY", and "CLARITY" are indicated on the My Menu screen as the menu items 341 registered on the My Menu tab. When the item "CONFIGURATION" 342 is selected and then the set button 78 is pressed, a My Menu tab configuration screen in FIG. 3D is displayed by the liquid crystal display 27 for making configuration on the My Menu tab that was being selected when the set button 78 was pressed.

FIG. 3D illustrates the My Menu tab configuration screen for making configuration on one of the My Menu tabs 320 to be configured. The My Menu tab configuration screen is comprised of menu items such as a menu item "SELECT ITEMS TO REGISTER" 351, a menu item "REORDER REGISTERED ITEMS" 352, a menu item "DELETE SELECTED ITEMS" 353, and so on. A Tab name 354 of the My Menu tab to be configured is indicated on the upper right of the My Menu tab configuration screen so as to make it clear which My menu tab is a target for the configuration. How the camera 100 operates when the My Menu tab configuration screen is displayed by the liquid crystal display 27 will be described in detail later with reference to FIG. 5.

FIG. 3E illustrates a selection screen "MY MENU TAB TO REGISTER" for use in a registration process for registering a menu item, which is in focus on the setting menu screen, directly on one of My Menu tabs without using the menu screen for the My Menu function. Specifically, the selection screen is for selecting one of My Menu tabs on which the menu item in focus is to be registered. In the present embodiment, in another registration process for registering a menu item on one of the My Menu tabs through the My Menu configuration screen, the My Menu tab 320 targeted for the registration is selected from among the small tabs on the menu screen for the My Menu function and then the registration is made, and hence it is unnecessary to cause the liquid crystal display 27 to display the selection screen "MY MENU TAB TO REGISTER" in FIG. 3E.

The selection screen "MY MENU TAB TO REGISTER" in FIG. 3E has the following selection items (options): selection items 371 for My Menu tabs (My Menu 1, My Menu 2), which have been already added, and a selection item "ADD MY MENU TAB" 372. The selection item "ADD MY MENU TAB" 372 is selected when a new My Menu tab is to be added to the menu screen for the My Menu function.

Figure 4:
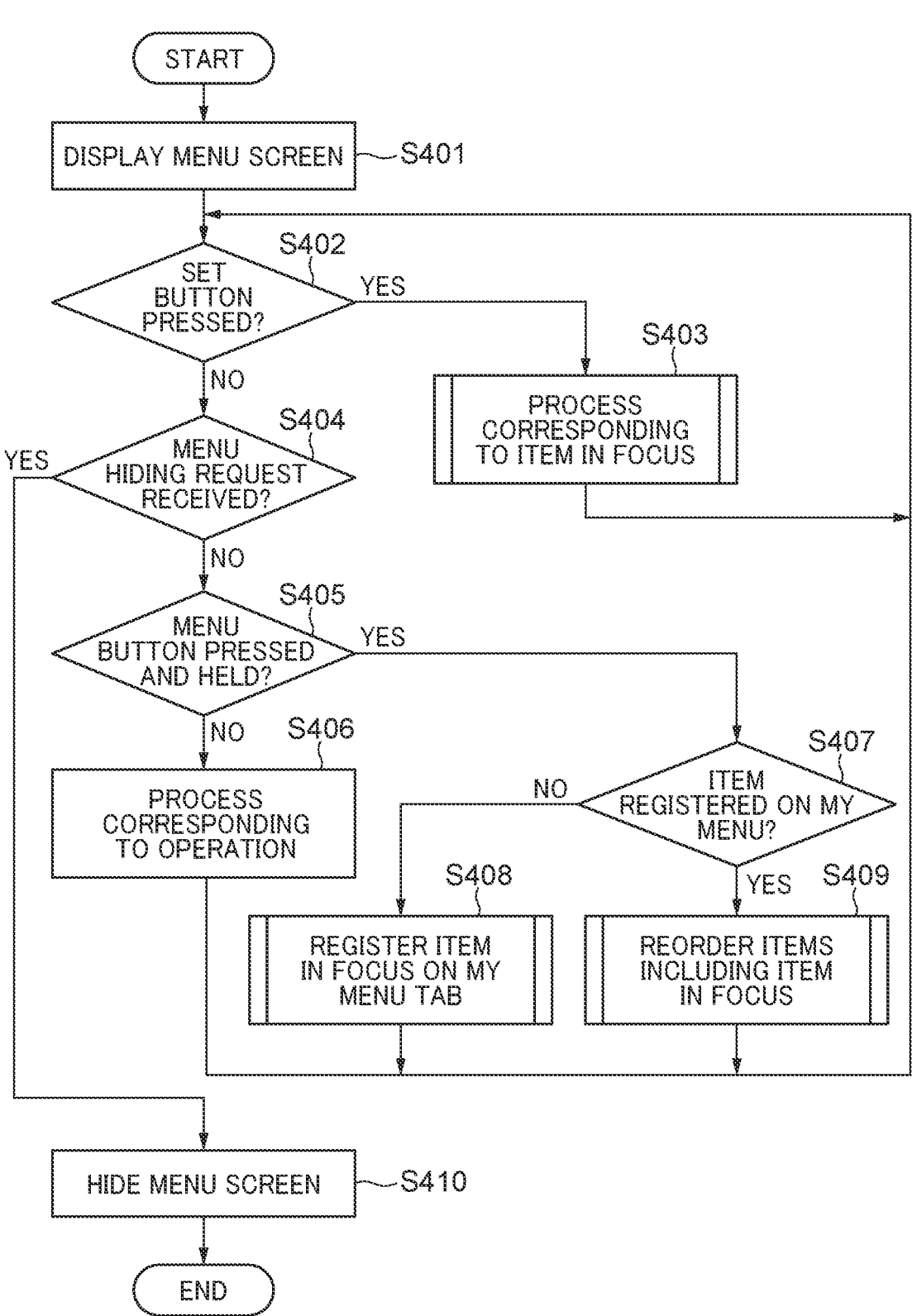
FIG. 4 is a flowchart illustrating a process that is carried out in the camera in FIG. 1 when a user performs a menu display operation.

FIG. 3F illustrates a reordering screen "REORDER REGISTERED ITEMS" for My Menu tabs. The reordering screen is a configuration screen for reordering menu items registered on one of the My Menu tabs to be configured, and indicates menu items 362 that are registered on the My Menu tab targeted for the reordering process. The menu items 362 include a menu item 361 the indication order or position of which is to be changed. Users are allowed to move up and down the menu item 361 and to reorder the registered menu items by moving the menu item 361 to a desired position in the registered menu items. FIG. 4 is a flowchart illustrating a process that is carried out by the system control unit 50 when a menu screen is displayed by the liquid crystal display 27. Upon receiving an instruction corresponding to a short depression of the menu button 75 by a user from the operation unit 70, the system control unit 50 starts carrying out the process of this flowchart.

First, in S401, the system control unit 50 causes the liquid crystal display 27 to display a menu screen (for example, FIG. 3A, FIG. 3B, or FIG. 3C). That is, when a short depression of the menu button 75 occurs with no menu screen being displayed, the system control unit 50 causes the liquid crystal display 27 to display the setting menu screen, the My Menu configuration screen, or the My Menu screen. The menu screen is displayed with one of the large tabs 300, one of the small tabs 307, and one of the menu items being in focus. As for a choice of the large tab to be in focus, the small tab to be in focus, and the menu item to be in focus, a menu screen may take over the choice that was made when the menu screen was displayed last time, or the menu screen may be displayed with the choice specified in advance.

Next, in S402, when the system control unit 50 receives an instruction corresponding to the depression of the set button 78 by a user from the operation unit 70 (YES in S402), the process proceeds to S403. On the other hand, when the system control unit 50 does not receive this instruction (NO in S402), the process proceeds to S404.

In S403, the system control unit 50 carries out a process corresponding to the menu item (309, 331 to 333, 341, 342, etc.) in focus on the menu screen displayed by the liquid crystal display 27, and the process then returns to S402. The process in S403 will be described later with reference to FIG. 5.

In S404, when the system control unit 50 receives a menu hiding request (YES in S404), the process proceeds to S410. When the system control unit 50 does not receive the menu hiding request (NO in S404), the process proceeds to S405. The condition for issuing the menu hiding request is that, for example, a request to play back an image or display a shooting screen has been issued, an image taking operation has been performed, or the menu button 75 has been pressed (short pressed).

In S405, when the system control unit 50 receives an instruction corresponding to a press-and-hold operation on the menu button 75 by a user from the operation unit 70 (YES in S405), the process proceeds to S407. On the other hand, when the system control unit 50 does not receive this instruction (NO in S405), the process proceeds to S406.

In S406, the system control unit 50 carries out a process corresponding to "another user operation", and the process then returns to S402. Another user operation is an operation other than the depression of the set button 78 (S403), the issuance of the menu hiding request (S404), and the press-and-hold operation on the menu button 75 (S405). Examples of the process corresponding to another user operation include a focus shifting process (changing the menu item selection) for any of the large tabs, the small tabs, and the menu items using the cross keys. In the focus shifting process, the system control unit 50 shifts the focus according to a user operation on the operation unit 70. When the focus is shifted from one of the large tabs to another and the large tab selection is changed, the liquid crystal display 27 displays the menu screen with small tabs and menu items corresponding to a newly-selected large tab. When the focus is shifted from one of the small tabs to another and the small tab selection is changed, the liquid crystal display 27 displays the menu screen with menu items corresponding to a newly-selected small tab.

Examples of the process corresponding to another user operation in S406 also include a process in which a quick setting customization screen is displayed by pressing and holding the Q button 76, and a process in which a button customization screen is displayed by pressing and holding the My-Fn button 77 as described below.

When the Q button 76 is pressed by a user while the shooting screen (standby screen for shooting) is displayed by the liquid crystal display 27, the system control unit 50 causes the liquid crystal display 27 to display a quick setting screen. The liquid crystal display 27 displays the quick setting screen in a manner being superimposed on a live view, and icons corresponding to menu items set by a user on the quick setting customization screen are indicated on the quick setting screen so that the user can change setting values for the menu items by selecting the icons, while viewing the live view on the liquid crystal display 27.

When a press-and-hold operation is performed on the Q button 76 by a user while the menu screen is displayed by the liquid crystal display 27, the system control unit 50 controls the liquid crystal display 27 to switch the display to the quick setting customization screen for registering on the quick setting screen a menu item which was in focus on the menu screen. Here, the system control unit 50 causes the liquid crystal display 27 to display the quick setting customization screen in a state where an item relating to the menu item that was in focus on the menu screen is selected as an item to be indicated on the quick setting screen.

When a short-press operation is performed on the My-Fn button 77 by a user in a state where a function has been registered on (or assigned to) the My-Fn button 77, the system control unit 50 executes the function registered on the My-Fn button 77. When a short-press operation is performed on the My-Fn button 77 by a user in a state where no function has been registered on (or assigned to) the My-Fn button 77, the system control unit 50 causes the liquid crystal display 27 to display the button customization screen for registering a function to be executed in response to operation of the My-Fn button 77.

When a press-and-hold operation is performed on the My-Fn button 77 by a user while the menu screen is displayed by the liquid crystal display 27, the system control unit 50 causes the liquid crystal display 27 to display the button customization screen for registering a function corresponding to a menu item, which was in focus on the menu screen, onto the My-Fn button 77. Here, the system control unit 50 causes the liquid crystal display 27 to display the button customization screen in a state where the function corresponding to the menu item that was in focus on the menu screen is selected.

The system control unit 50 also causes the liquid crystal display 27 to display a guidance that proposes the use of "My Menu", "Quick Settings", and/or "Customize Buttons" for a user who repeatedly makes the same setting on the camera 100. Specifically, the system control unit 50 is configured to have counters for the respective menu items, and for each menu item, count the number of times a user has accessed the menu item. When a certain menu item is accessed a predetermined number of times or more, the system control unit 50 causes the liquid crystal display 27 to display the guidance. That is, the system control unit 50 uses the counters to count the number of times that each setting item has been set, and operates as described below when it determines that a certain menu item has been set a predetermined number of times or more. The system control unit 50 provides a notification that prompts a user to register the menu item on a My Menu tab by performing a press-and-hold operation on the menu button 75 while the menu screen is displayed by the liquid crystal display 27.

In S407, the system control unit 50 determines whether or not the menu item in focus is one of the menu items 341 registered on one of the My Menu tabs 320 which are to be indicated on the menu screen when the My Menu large tab 300g is selected.

When the menu item in focus is one of the menu items 341 registered on one of the My Menu tabs 320 (YES in S407), the process proceeds to S409. On the other hand, when the menu item in focus is a menu item (one of the menu items 309 on the setting menu screen) other than the menu items registered on the My Menu tabs (NO in S407), the process proceeds to S408. In S408, since the press-and-hold operation performed on the menu button 75 by a user is an operation for a menu item other than the menu items registered on the My Menu tabs, the system control unit 50 carries out a registration process for registering the menu item in focus on one of the My Menu tabs and proceeds to S402. The registration process for registering the menu item in focus on one of the My Menu tabs in S408 will be described later with reference to FIG. 6.

In S409, since the press-and-hold operation performed on the menu button 75 by a user is an operation for a menu item indicated (registered) on one of the My Menu tabs 320, the system control unit 50 does not carry out the registration process of S408 for registering the menu item on one of the My Menu tabs 320. Instead, the system control unit 50 carries out a process of reordering items registered on the My Menu tab, which include the menu item in focus, (changes the order in which the menu item in focus is indicated) and then returns to S402. The reordering process for reordering the registered items including the menu item in focus in S409 will be described later with reference to FIG. 7. In S410, the system control unit 50 causes the liquid crystal display 27 to hide the menu screen (FIG. 3A) and ends the process.

Although in the present embodiment, the system control unit 50 changes the process based on the determination in S407, the system control unit 50 may omit the determination in S407 and carry out the process of S408 in which the menu item in focus is registered on one of the My Menu tabs. In a case where, in the process of S408, the menu item in focus is one of the menu items 331 to 333 on the My Menu configuration screen or the item "CONFIGURATION" 342 on the My Menu screen, the menu item is not suitable for the registration on a My Menu tab, and hence the process returns to S402 without the system control unit 50 carrying out the process of S408. Furthermore, in the process of S409, the system control unit 50 may cause a user to select whether to register the menu item in focus or to reorder the menu item in focus. The system control unit 50 may carry out deletion of the menu item or a relevant tab from the My Menu screen other than the registering process and the reordering process.

As described above, according to the present embodiment, while the menu screen is displayed by the liquid crystal display 27, the system control unit 50 receives a press-and-hold operation, not a short-press operation, on the menu button 75, which is mainly for displaying/hiding the menu screen, and then registers on the My Menu screen (My Menu tab) a menu item selected or in focus on the menu screen. It allows users to easily register the selected menu item on the My Menu screen (My Menu tab).

Figure 5:
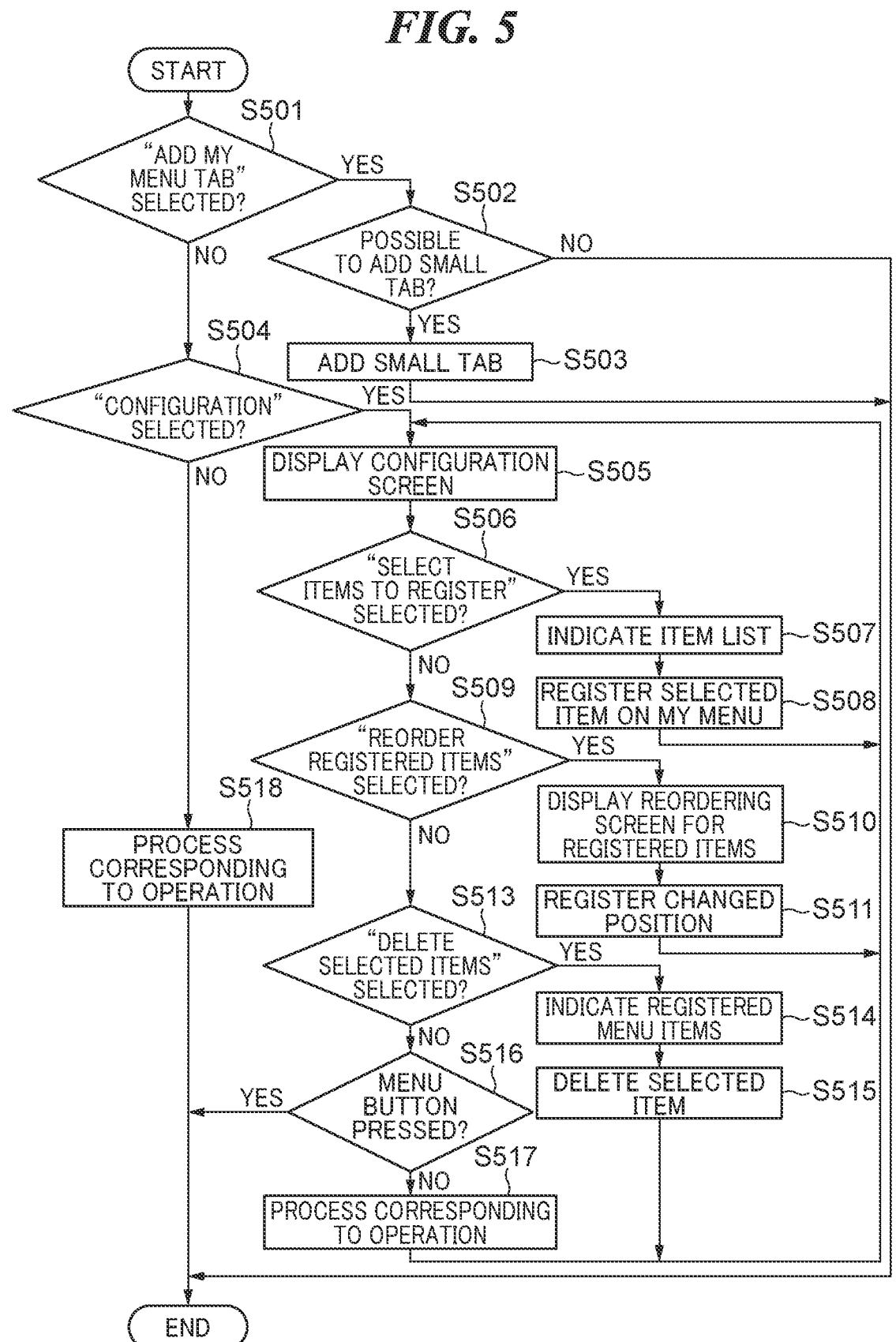
FIG. 5 is a flowchart illustrating a process of step S403 in FIG. 4, which is a process corresponds to an item in focus.

FIG. 5 is a flowchart illustrating in detail an example of the process of S403 in FIG. 4, which is a process corresponding to an item in focus, to be carried out in response to the depression of the set button 78. The following description of this flowchart focuses a process relating to configuration on the My Menu function made on the My Menu configuration screen, and description of the other processes is omitted.

In S501, the system control unit 50 determines whether or not a menu item that is in focus (selected) when the set button 78 is pressed is the menu item "ADD MY MENU TAB" 331 on the My Menu configuration screen. When the system control unit 50 determines that the menu item being selected is the menu item "ADD MY MENU TAB" 331 (YES in S501), the process proceeds to S502. On the other hand, when the system control unit 50 determines that the menu item being selected is not the menu item "ADD MY MENU TAB" 331 (NO in S501), the process proceeds to S504.

In S502, the system control unit 50 determines whether or not a My Menu tab (small tab) can be added to the menu screen (the menu screen for the My Menu function). When the system control unit 50 determines that a My Menu tab can be added to the menu screen (YES in S502), the process proceeds to S503. On the other hand, when the system control unit 50 determines that a My Menu tab cannot be added to the menu screen because, for example, a maximum number of My Menu tabs have already been added to the menu screen (NO in S502), the system control unit 50 notifies users of a warning or the like and ends the process. In S503, the system control unit 50 adds one My Menu tab to the menu screen (the menu screen for the My Menu function) and ends the process.

In S504, when the system control unit 50 determines that the menu item, which is in focus (being selected) at the time of the set button 78 being pressed, is the item "CONFIGURATION" 342 (see FIG. 3C) (YES in S504), the process proceeds to S505. On the other hand, when the system control unit 50 determines that the menu item being selected is not the item "CONFIGURATION" 342 (NO in S504), the process proceeds to S518. In S518, the system control unit 50 carries out a process corresponding to the user operation, and ends the process of S403.

In S505, the system control unit 50 causes the liquid crystal display 27 to display the My Menu tab configuration screen (FIG. 3D) on which one of the My menu tabs that was selected at the time of the set button 78 being pressed is a processing target (configuration target). In S505 to S517, configuration on the My menu tab selected as the configuration target is made.

In S506, the system control unit 50 determines whether or not the menu item "SELECT ITEMS TO REGISTER" 351 (see FIG. 3D) on the My Menu tab configuration screen is selected by a user pressing the set button 78 while the menu item "SELECT ITEMS TO REGISTER" 351 is being selected. When the system control unit 50 determines that the menu item "SELECT ITEMS TO REGISTER" 351 is selected (YES in S506), the process proceeds to S507.

When the system control unit 50 determines that the menu item "SELECT ITEMS TO REGISTER" 351 is not selected (NO in S506), the process proceeds to S509. In S507, the system control unit 50 causes the liquid crystal display 27 to indicate an item list which is a list of menu items that can be registered on the My menu tab selected as the configuration target. As the item list, all the menu items included in the large tabs 300a to 300f are indicated in list format. On this occasion, all the menu items are indicated in list format without being color-coded or categorized according to tabs. For this reason, in a case where a user selects a desired menu item from this item list, selecting the desired menu item is more difficult than in a case where a menu item is selected using the large tabs and the small tabs on the hierarchical setting menu screen. In the item list, a menu item that has already been registered on the My menu tab selected as the configuration target may be grayed out.

In S508, the system control unit 50 additionally registers the menu item selected from the item list indicated in S507 on the My menu tab as the configuration target. After that, the system control unit 50 ends the registered item selection process, and the process returns to S505 (in which the My menu tab configuration screen is displayed).

In S509, the system control unit 50 determines whether or not the menu item "REORDER REGISTERED ITEMS" 352 on the My Menu tab configuration screen is selected by a user pressing the set button 78 while the menu item "REORDER REGISTERED ITEMS" 352 is being selected. When the system control unit 50 determines that the menu item "REORDER REGISTERED ITEMS" 352 is selected (YES in S509), the process proceeds to S510.

When the system control unit 50 determines that the menu item "REORDER REGISTERED ITEMS" 352 is not selected (NO in S509), the process proceeds to S513. In S510, the system control unit 50 causes the liquid crystal display 27 to display the reordering screen "REORDER REGISTERED ITEMS" (FIG. 3F) for reordering the menu items registered on the My menu tab as the configuration target.

Then, in S511, the system control unit 50 changes the order of the menu items 341 as instructed by a user on the reordering screen "REORDER REGISTERED ITEMS". Although in the present embodiment, the system control unit 50 is configured to reorder the menu items only within the My Menu tab being selected, the system control unit 50 may be configured to move the registered menu items to another tab inside the My Menu configuration screen. After that, the system control unit 50 ends the registered item selecting process, and the process returns to S505 (in which the My menu tab configuration screen is displayed).

In S513, the system control unit 50 determines whether or not the menu item "DELETE SELECTED ITEMS" 353 on the My Menu tab configuration screen is selected by a user pressing the set button 78 while the menu item "DELETE SELECTED ITEMS" 353 is being selected. When the system control unit 50 determines that the menu item "DELETE SELECTED ITEMS" 353 is selected (YES in S513), the process proceeds to S514. On the other hand, when the system control unit 50 determines that the menu item "DELETE SELECTED ITEMS" 353 is not selected (NO in S513), the process proceeds to S516.

In S514, the system control unit 50 causes the liquid crystal display 27 to indicate a registered item list which is a list of the menu items 341 that have already been registered on the My Menu tab as the configuration target. Then, in S515, the system control unit 50 deletes a menu item, which is selected by a user from the registered item list, from the My Menu tabs as the configuration target.

In S516, the system control unit 50 determines whether or not the menu button 75 is pressed. When the menu button 75 is pressed (YES in S516), the system control unit 50 ends the display of the My Menu tab configuration screen and causes the liquid crystal display 27 to display the menu screen again. The system control unit 50 then ends the present process, and returns to the process of FIG. 4 (S402). On the other hand, when the system control unit 50 determines that the menu button 75 is not pressed (NO in S516), the process proceeds to S517.

In S517, in response to a user operation other than S506, S509, S513, and S516, the system control unit 50 carries out a process corresponding to the user operation, and the process then returns to S505.

In S518, the system control unit 50 carries out a process corresponding to a menu item, which is in focus (being selected) when the set button 75 is pressed, and ends the process of S403. For example, when the menu item being in focus is a menu item on the setting menu screen, the system control unit 50 carries out a process of changing a setting value for the menu item. After that, the system control unit 50 ends the present process, and the process then returns to the process of FIG. 4 (S402).

Figure 6:
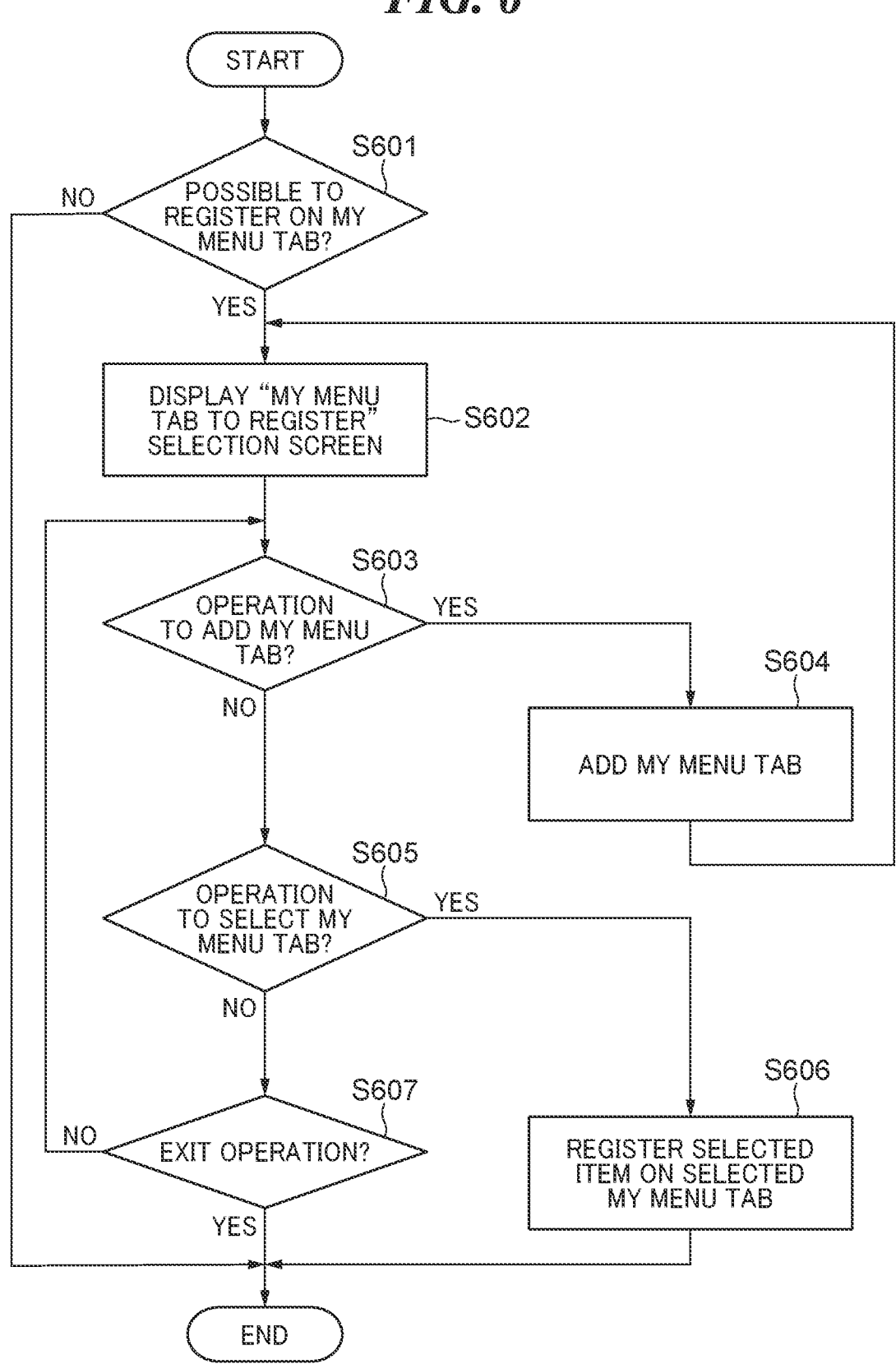
FIG. 6 is a flowchart illustrating a process of step S408 in FIG. 4, which is a process of registering an item in focus in My Menu.

FIG. 6 is a flowchart illustrating in detail a registration process of S408 in FIG. 4, which is carried out in response to a press-and-hold operation on the menu button 75 while the setting menu screen is displayed by the liquid crystal display 27, and is intended to register a menu item in focus on a My Menu tab.

In S601, the system control unit 50 determines whether or not a menu item can be registered on a My Menu tab. When the system control unit 50 determines that the menu item can be registered (YES in S601), the process proceeds to S602. On the other hand, when the system control unit 50 determines that the menu item cannot be registered (NO in S601), the system control unit 50 ends the registration process. In S602, the system control unit 50 causes the liquid crystal display 27 to display the selection screen "MY MENU TAB TO REGISTER" (see FIG. 3E) indicating a list of My Menu tabs on which the menu item can be registered.

In S603, when the selection item "ADD MY MENU TAB" 372 is selected on the selection screen "MY MENU TAB TO REGISTER" (YES in S603), the process proceeds to S604. On the other hand, when the selection item "ADD MY MENU TAB" 372 is not selected on the selection screen "MY MENU TAB TO REGISTER" (NO in S603), the process proceeds to S605.

In S604, the system control unit 50 adds a My Menu tab (adds a small tab) to the menu screen for the My Menu function, and the process returns to S602. In S602, the system control unit 50 causes the liquid crystal display 27 to display the selection screen "MY MENU TAB TO REGISTER" indicating the options including the My Menu tab added in S604.

In S605, when one of the My Menu tabs that have been added to the menu screen for the My Menu function is selected (YES in S605), the process proceeds to S606. On the other hand, when none of the My Menu tabs that have been added to the menu screen for the My Menu function is selected (NO in S605), the process proceeds to S607.

In S606, the system control unit 50 registers, on the My Menu tab selected in S605, a menu item which was in focus when an instruction corresponding to a press-and-hold operation performed on the menu button 75 by a user was received from the operation unit 70 in S405.

In S607, when an operation to exit the selection screen "MY MENU TAB TO REGISTER" (FIG. 3E) is performed (YES in S607), the system control unit 50 ends the registration process and causes the liquid crystal display 27 to display the menu screen again, and returns to the process of FIG. 4. When the process is not to be ended (NO in S607), the process returns to S603.

In the present embodiment, the system control unit 50 is configured to cause a user to select a My Menu tab, on which a menu item is to be registered, from My Menu tabs that have already been added to the menu screen for the My Menu function. The system control unit 50, however, may be configured to automatically determine a My Menu tab on which a menu item is to be registered, without prompting a user to select a My Menu tab on which a menu item is to be registered. For example, when there is only one My Menu tab that has already been added to the menu screen for the My Menu function, the system control unit 50 may register a menu item on the one My Menu tab that has already been added, without prompting a user to select a My Menu tab by causing the liquid crystal display 27 to display the selection screen "MY MENU TAB TO REGISTER". When there is a plurality of My Menu tabs that have already been added to the menu screen for the My Menu function, the system control unit 50 may cause the liquid crystal display 27 to display the selection screen "MY MENU TAB TO REGISTER" and prompt a user to select one of the My Menu tabs. The system control unit 50 may also add a menu item to all of My Menu tabs that the menu item can be added to. The system control unit 50 may be configured to cause the liquid crystal display 27 to indicate the registered menu items 341 belonging to a My Menu tab being selected, as reference information.

Figure 7:
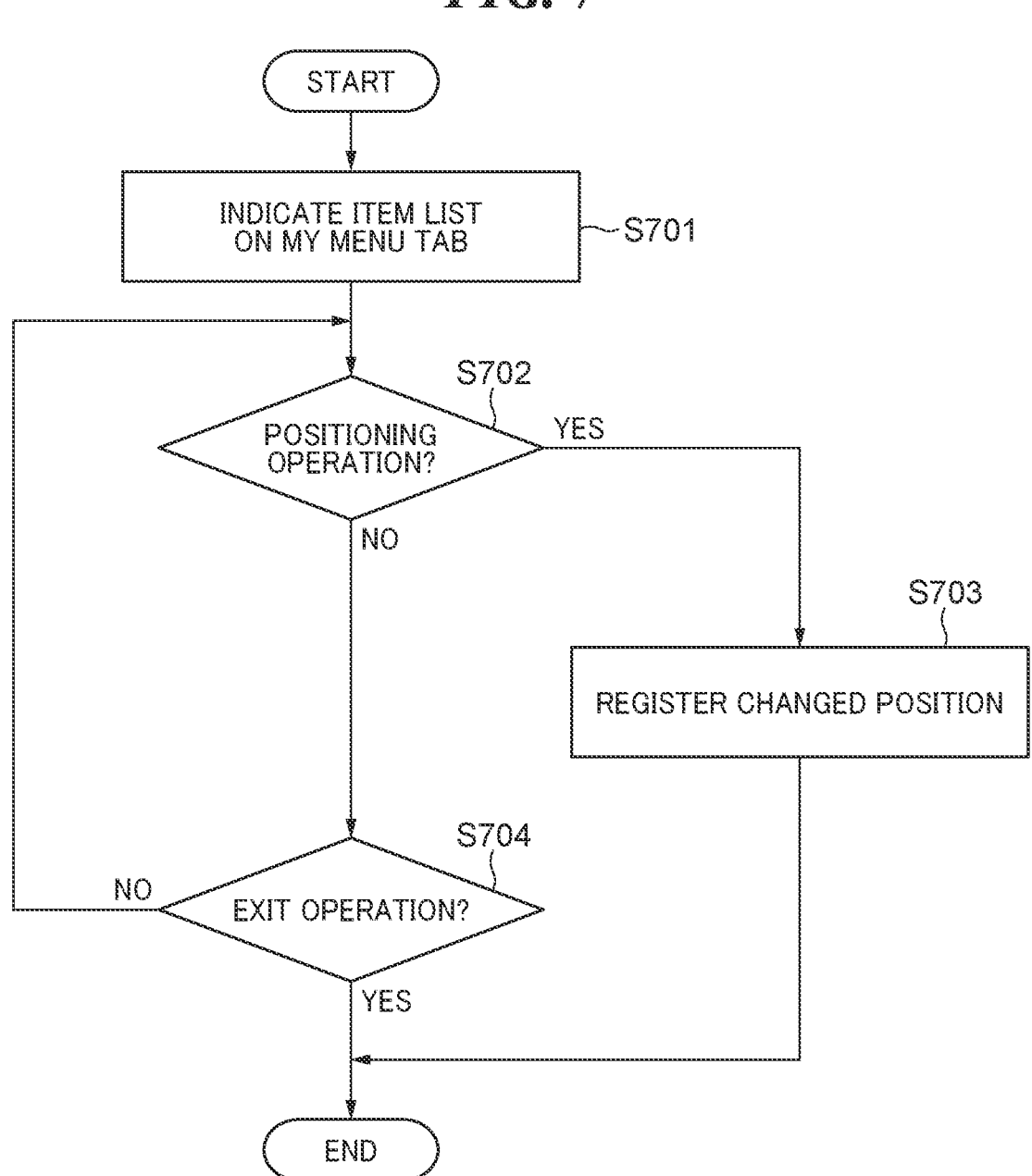
FIG. 7 is a flowchart illustrating a process of step S409 in FIG. 4, which is a process of reordering items including an item in focus.

FIG. 7 is a flowchart illustrating in detail an example of the process of S409 in FIG. 4 in which a menu item group including a menu item in focus is reordered.

First, in S701, the system control unit 50 causes the liquid crystal display 27 to indicate on the reordering screen the registered menu items 341 which were indicated on the My Menu screen when an instruction corresponding to a press-and-hold operation on the menu button 75 by a user was received from the operation unit 70 in S405. At this time, the system control unit 50 brings a menu item that was in focus when the instruction corresponding to the press-and-hold operation on the menu button 75 by the user was received from the operation unit 70 in S405, into a selected state as the menu item 361 the indication order of which is to be changed (see FIG. 3F).

Next, in S702, when a user performs a positioning operation in which the position of the menu item 361 is specified (YES in S702), the process proceeds to S703. On the other hand, when the positioning operation is not performed (NO in S702), the process proceeds to S704.

In S703, the system control unit 50 updates the order of the menu items 341 registered on the My Menu tab such that the menu item 361 is indicated at a position based on the positioning operation performed by a user, and ends the process. In S704, when a user performs an operation to exit the reordering screen (YES in S704), the system control unit 50 ends the reordering process.

On the other hand, in S704, when the operation to exit the reordering screen is not performed by the user (NO in S704), the process returns to S702. As described above, the system control unit 50 is capable of reordering menu items (second setting item group) registered on one of the My Menu tabs (the My Menu screen) in response to a press-and-hold operation on the menu button 75.

It should be noted that the system control unit 50 may call a newly-registered menu item, which was registered upon receipt of a press-and-hold operation on the button (75, 76, 77) by a user while the My Menu screen, the quick setting customization screen, or the button customization screen is displayed by the liquid crystal display 27, and then cause the liquid crystal display 27 to indicate the called menu item.

With reference to FIGS. 3A to 3F and FIG. 4 to FIG. 7, descriptions have been given of the process of registering a selected menu item onto a My Menu tab easily in response to a press-and-hold operation on the menu button 75, and the process of changing the indication order of a selected menu item in response to a press-and-hold operation on the menu button 75 (reordering process). These processes may be carried out in the same manner for the quick setting customization screen and the button customization screen as well.

On the setting menu screen, menu items are arranged in a hierarchical manner by category (in large tabs) and by the number of items (in small tabs), which is user friendly since users can easily select a desired menu item. On the contrary, in a case where a menu item is registered on a My Menu tab via the menu item "SELECT ITEMS TO REGISTER" 351 on the My Menu tab configuration screen, a list of menu items that can be registered on the My Menu tab is not displayed in a hierarchical manner, which is less user friendly regarding the menu item selection. Moreover, in a case where a menu item group registered on one of the My Menu tabs is reordered via the menu item "REORDER REGISTERED ITEMS" 352 on the My Menu tab configuration screen, users need to perform an operation to select the menu item "REORDER REGISTERED ITEMS" 352 after causing the liquid crystal display 27 to display the My Menu configuration screen. In the present embodiment, the system control unit 50 is configured to, while a menu item is being selected from menu items on the menu screen indicated in a hierarchical manner, receive a press-and-hold operation performed on the menu button 75 by a user, and then carry out a process of registering the selected menu item on a My Menu tab (the My Menu screen) or a process of reordering a menu item group including the selected menu item. This allows users to easily select a menu item for use in the process of registration on one of the My Menu tabs or the process of reordering menu items. Users are also allowed to register a desired menu item on one of the My Menu tabs and to change the indication order of menu items, through intuitive and simple operations, without accessing the My Menu configuration screen and selecting the menu item "SELECT ITEMS TO REGISTER" 351 or the menu item "REORDER REGISTERED ITEMS" 352.

According to the embodiment described above, one aspect of the disclosure provides the configuration described below. The system control unit 50 is configured to cause a display (the liquid crystal display 27) to display a first display screen that indicates a first setting item group, or a second display screen that indicates a second setting item group that is a part of the first setting item group. The system control unit 50 is further configured to select an item from the second setting item group on the second display screen. The system control unit 50 is further configured to, in response to a first operation performed while the second display screen is displayed by the liquid crystal display 27, change an order in which the item selected from the second setting item group is indicated on the second display screen. This eliminates or reduces user operations to reorder items on a dedicated reordering screen and hence improves operability for users. The system control unit 50 may be further configured to, in response to the first operation performed while the first display screen is displayed by the liquid crystal display 27, register an item, which is selected from the first setting item group on the first display screen, as an item in the second setting item group.

Moreover, in the electronic apparatus, a plurality of second setting item groups may be registrable, and the system control unit 50 may be configured to control the liquid crystal display 27 to indicate one second setting item group among the plurality of second setting item groups on the second display screen in response to a user operation. In this case, the system control unit 50 may be configured to change the order in which the item selected from the second setting item group is indicated in the one second setting item group currently being indicated on the second display screen. Moreover, the system control unit 50 may be configured to control the liquid crystal display 27 to indicate on the second display screen the second setting item group and a predetermined item for configuration of the second setting item group. In this case, the system control unit 50 causes the liquid crystal display 27 to display a configuration screen for configuration of the second setting item group in response to selection of the predetermined item. As a result, the system control unit 50 is also configured to change the order in which the second setting item group is indicated on the second display screen, in response to selection of an item for reordering on the configuration screen.

With the configuration described above, in the electronic apparatus capable of displaying the second display screen, which indicates only items "customized" and registered by a user of the camera 100 among a plurality of setting items, it is possible to change the indication order of the items on the second display screen with a simple operation. This implements the electronic apparatus equipped with a user interface that is easy for users to understand. It should be noted that examples of the first operation include a press-and-hold operation on the menu button 75 or the like (specific button) and an audio input operation for specific wording.

Although in the embodiment described above, the camera 100 is configured to have a plurality of My Menu tabs, the camera 100 may be configured to have only one My Menu tab and cause the liquid crystal display 27 to indicate menu items on the My Menu tab such that they can be scrolled. The camera 100 may also be configured to have a touch panel capable of detecting touches on the liquid crystal display 27 as the operation unit 70 so that users can touch a desired menu item on the touch panel to perform the registration process or the reordering process on the menu item. In this case, a touch operation on the touch panel for performing the registration process or the reordering process can be a touch-and-hold operation, a drag operation, or a double-tap operation, which are different from a normal tap operation for selecting a menu item. In this case, the camera 100 can be equipped with a device suitable for touch operations, e.g., a display device that has both a display function and a touch operation detecting function as distinct from the display (liquid crystal display) in the embodiment described above.

The camera 100 may be further equipped with a touch panel capable of detecting touch operations. In this case, when the touch panel detects a touch operation or a touch-and-hold operation on a setting item while a menu screen is displayed, the system control unit 50 may omit calling menu items registered on a My Menu tab.

Moreover, the processes in FIG. 4 to FIG. 7 may be carried out by coordination between the camera 100 and an external apparatus capable of communicating with the camera 100. The external apparatus can be any electronic apparatus capable of communicating with the camera 100 and equipped with a processor capable of executing an application for coordinating with the camera 100. For example, an application for coordination downloaded from a specific site is installed by a user into a mobile terminal. In a state where the communicator unit 54 provided in the camera 100 and the mobile terminal are communicable with each other, the application is started on the mobile terminal to cause the display of the mobile terminal to display a screen indicating a setting item group, which is indicated on the liquid crystal display 27 of the camera 100, so that users other than the owner of the camera 100 can see what is displayed by the liquid crystal display 27 of the camera 100. Moreover, for example, by using this application, the system control unit 50 of the camera 100 may obtain information on an item selected from a setting item group in the mobile terminal via the communication unit 54 and register the selected item on the My Menu screen or change the order in which the selected item is indicated. Furthermore, although in the embodiment described above, the camera 100 is taken as an example of electronic apparatuses, the electronic apparatuses are not limited to cameras as long as they have a number of setting items and allow users to, for example, register their preferred setting items on a My Menu screen or the like.

Other Embodiments

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2023-027220 filed on Feb. 24, 2023 which is hereby incorporated by reference herein in its entirety.

What is claimed is:

1. An image capturing apparatus comprising:
a display;
a memory storing instructions; and
at least one processor that executes the instructions to:
cause the display to display a first display screen that indicates a first setting item group or a second display screen that indicates a second setting item group that is a part of the first setting item group;
select an item from the second setting item group on the second display screen; and
in response to a first operation associated with the selected item while the second display screen is displayed by the display, perform a reordering process to change an order in which the selected item is indicated on the second display screen,
wherein, in response to a user operation performed on the second display screen while an item is selected from the second setting item group, the at least one processor executes the instructions to:
perform, when the operation is the first operation, a reordering process to change a display order of the selected item in the second setting item group on the second display screen; and
perform, when the operation is a second operation different from the first operation, a process corresponding to the selected item.

2. The image capturing apparatus according to claim 1, wherein the at least one processor executes the instructions to, in response to the first operation performed while the first display screen is displayed by the display, register an item selected from the first setting item group on the first display screen as an item in the second setting item group.

3. The image capturing apparatus according to claim 1, wherein a plurality of second setting item groups is registrable, and
the at least one processor executes the instructions to control the display to indicate one second setting item group among the plurality of second setting item groups on the second display screen in response to a user operation.

4. The image capturing apparatus according to claim 3, wherein the at least one processor executes the instructions to change an order in which the item selected from the second setting item group is indicated in the one second setting item group currently being indicated on the second display screen.

5. The image capturing apparatus according to claim 1, wherein the at least one processor executes the instructions to control the display to indicate on the second display screen the second setting item group and a predetermined item for configuration of the second setting item group,
cause the display to display a configuration screen for configuration of the second setting item group in response to selection of the predetermined item, and
in response to selection of an item for reordering on the configuration screen, change an order in which the second setting item group is indicated on the second display screen.

6. The image capturing apparatus according to claim 1, wherein, when an instruction to change a display order of the second setting item group on the second display screen is made through an operation different from the first operation on the second display screen, the at least one processor executes the instructions to cause the display to display a setting screen that allows selection of an item from the second setting item group whose display order is to be changed and an operation for changing the display order of the selected item, and
when the first operation is performed on the second display screen, the setting screen is displayed with the item selected on the second display screen in a state of being selected as a target item whose display order is to be changed.

7. The image capturing apparatus according to claim 1, wherein the second setting item group includes items of the first setting item group that are registered by a user.

8. The image capturing apparatus according to claim 7, wherein the image capturing apparatus is an imager including an image sensor,
the first setting item group includes menu items for settings of the imager, and
the second setting item group includes setting items of the first setting item group that are registered by the user to be displayed on the second display screen.

9. The image capturing apparatus according to claim 8, wherein the at least one processor executes the instructions to cause the display to display:
when displaying the first display screen, a first display item for switching to the first display screen, a second display item for switching to the second display screen, and the first setting item group; and
when displaying the second display screen, the first display item, the second display item, and the second setting item group.

10. The image capturing apparatus according to claim 1, wherein the at least one processor executes the instructions to:
select an item from the first setting item group on the first display screen;
in response to a user operation performed on the first display screen while the item is selected from the first setting item group,
perform, when the operation is the first operation, a registration process to register the selected item as part of the second setting item group on the first display screen; and
perform, when the operation is the second operation, a process corresponding to the selected item.

11. The image capturing apparatus according to claim 10, wherein the first operation is a long-press operation on a specific component.

12. The image capturing apparatus according to claim 11, the specific component is a touch panel, the first display screen or the second display screen is displayed on the touch panel, the first operation is a long-press touch operation on an item selected on the first display screen or the second display screen, and the second operation is a tap operation on an item selected on the first display screen or the second display screen.

13. A control method for an image capturing apparatus, comprising:

causing a display to display a first display screen that indicates a first setting item group or a second display screen that indicates a second setting item group that is a part of the first setting item group;

selecting an item from the second setting item group on the second display screen; and in response to a first operation associated with the selected item while the second display screen is displayed by the display, performing a reordering process for changing an order in which the selected item is indicated on the second display screen, wherein, in response to a user operation performed on the second display screen while an item is selected from the second setting item group, performing, when the operation is the first operation, a reordering process to change a display order of the selected item in the second setting item group on the second display screen; and performing, when the operation is a second operation different from the first operation, a process corresponding to the selected item.

14. The control method according to claim 13, comprising:

in response to the first operation performed while the first display screen is displayed by the display, registering an item selected from the first setting item group on the first display screen as an item in the second setting item group.

15. The control method according to claim 13, wherein a plurality of second setting item groups is registrable, and the control method comprises controlling the display to indicate one second setting item group among the plurality of second setting item groups on the second display screen in response to a user operation.

16. The control method according to claim 15, comprising:

changing an order in which the item selected from the second setting item group is indicated in the one second setting item group currently being indicated on the second display screen.

17. The control method according to claim 13, comprising:

controlling the display to indicate on the second display screen the second setting item group and a predetermined item for configuration of the second setting item group;

causing the display to display a configuration screen for configuration of the second setting item group in response to selection of the predetermined item; and in response to selection of an item for reordering on the configuration screen, changing an order in which the second setting item group is indicated on the second display screen.

18. A non-transitory computer-readable storage medium storing a program for causing a computer to execute a control method for an image capturing apparatus, the control method comprising:

causing a display to display a first display screen that indicates a first setting item group or a second display screen that indicates a second setting item group that is a part of the first setting item group;

selecting an item from the second setting item group on the second display screen; and in response to a first operation associated with the selected item while the second display screen is displayed by the display, performing a reordering process for changing an order in which the selected item is indicated on the second display screen, wherein, in response to a user operation performed on the second display screen while an item is selected from the second setting item group, performing, when the operation is the first operation, a reordering process to change a display order of the selected item in the second setting item group on the second display screen; and performing, when the operation is a second operation different from the first operation, a process corresponding to the selected item.

\* \* \* \* \*